(12) United States Patent
Zou et al.

(10) Patent No.: US 9,124,771 B2
(45) Date of Patent: Sep. 1, 2015

(54) VALID REPLACEMENT DATA IN ENCODED VIDEO

(75) Inventors: Dekun Zou, Princeton Junction, NJ (US); Wenjun Lu, Greenbelt, MD (US)

(73) Assignee: THOMSON LICENSING, Issy les Moulineaux (FR)

( * ) Notice: Subject to any disclaimer, the term of this patent is extended or adjusted under 35 U.S.C. 154(b) by 36 days.

(21) Appl. No.: 13/576,436

(22) PCT Filed: Jan. 28, 2011

(86) PCT No.: PCT/US2011/000164
§ 371 (c)(1),
(2), (4) Date: Aug. 1, 2012

(87) PCT Pub. No.: WO2011/097010
PCT Pub. Date: Aug. 11, 2011

(65) Prior Publication Data
US 2012/0300926 A1    Nov. 29, 2012

Related U.S. Application Data

(60) Provisional application No. 61/337,376, filed on Feb. 3, 2010.

(51) Int. Cl.
*G06F 7/04* (2006.01)
*H04N 7/167* (2011.01)
*H04N 21/2347* (2011.01)
*H04N 21/63* (2011.01)
*H04N 21/8358* (2011.01)

(52) U.S. Cl.
CPC ....... *H04N 7/1675* (2013.01); *H04N 21/23476* (2013.01); *H04N 21/631* (2013.01); *H04N 21/8358* (2013.01)

(58) Field of Classification Search
CPC ........... G09C 1/04; H04L 9/06; H04L 9/0858
USPC .......................................................... 726/32
See application file for complete search history.

(56) References Cited

U.S. PATENT DOCUMENTS

| | | | | |
|---|---|---|---|---|
| 6,141,385 | A * | 10/2000 | Yamaji | 375/240.27 |
| 6,381,282 | B1 * | 4/2002 | Kwan et al. | 375/240.27 |
| 6,505,299 | B1 | 1/2003 | Zeng et al. | |
| 6,990,151 | B2 * | 1/2006 | Kim et al. | 375/240.27 |
| 8,705,668 | B2 * | 4/2014 | Sahlin | 375/341 |
| 2002/0028061 | A1 * | 3/2002 | Takeuchi et al. | 386/68 |

(Continued)

FOREIGN PATENT DOCUMENTS

| | | |
|---|---|---|
| CN | 1777941 A | 5/2006 |
| FR | 2860122 | 3/2005 |

(Continued)

OTHER PUBLICATIONS

Search Report Jun. 4, 2011.

*Primary Examiner* — Mohammad W Reza
(74) *Attorney, Agent, or Firm* — Robert D. Shedd; Richard LaPeruta

(57) ABSTRACT

A security method for H.264 video streams and the like is provided that comprises: coding video data with incorrect or missing bytes, whereby the coded video is corrupted or distorted; generating replacement data that corrects the coded video during decoding; and distributing the replacement data to users.

15 Claims, 4 Drawing Sheets

(56) References Cited

U.S. PATENT DOCUMENTS

| | | |
|---|---|---|
| 2005/0185821 A1 | 8/2005 | Le Comte et al. |
| 2006/0164544 A1 | 7/2006 | Le Comte et al. |
| 2007/0038861 A1 | 2/2007 | Weber et al. |
| 2007/0043997 A1* | 2/2007 | Yang et al. ............... 714/758 |
| 2007/0130497 A1* | 6/2007 | Chambers ............... 714/780 |
| 2007/0198414 A1 | 8/2007 | Derrenberger |
| 2007/0277039 A1 | 11/2007 | Zhao |
| 2009/0326961 A1 | 12/2009 | Petrovic et al. |

FOREIGN PATENT DOCUMENTS

| | | |
|---|---|---|
| JP | 2000-253375 A | 9/2000 |
| JP | 2002-135594 A | 5/2002 |
| JP | 2007-027860 A | 2/2007 |
| JP | 2007-529968 A | 10/2007 |
| JP | 2008-016947 A2 | 1/2008 |
| JP | 2009-284035 A | 12/2009 |
| WO | WO2005008385 A2 | 1/2005 |

* cited by examiner (A)

(B)

VALID REPLACEMENT DATA IN ENCODED VIDEO

CROSS-REFERENCE TO RELATED APPLICATIONS

This application claims the benefit, under 35 U.S.C. §365 of International Application PCT/US2011/000,164, filed 28 Jan. 2011, which was published in accordance with PCT Article 21(2) on 11 Aug. 2011, in English and which claims the benefit of U.S. Provisional Application Ser. No. 61/337,376 filed 3 Feb. 2010.

FIELD OF THE INVENTION

The invention relates to the forensic marking scheme on H.264 streams in which the forensic marking scheme replaces portions of the video data with random or incorrect bytes which require valid replacement data for successful decoding.

BACKGROUND OF THE INVENTION

Content protection techniques play critical roles in protecting intellectual property of content producers. Security issues of content protection systems have been receiving great attention. However, despite the huge efforts that have been devoted to developing content protection techniques and products which are advertised to counteract piracy, most existing techniques still fail catastrophically once an implementation is compromised. This poses serious threats and great economical loss to content producers. For example, the official Content Scrambling System (CSS), which is used for DVD videos and is confidential and licensed by the DVD Copy Control Association (http://www.dvdcca.org), has been considered to be trivial to break by some (F. A. Stevenson, "*Cryptanalysis of Contents Scrambling System*," white paper, DVD-copy.com, November 1999).

The security risk that CSS faces is believed to stem from the fact that the security of CSS is defined in the DVD player with a simple, fixed security policy for all content. A compromised player can decrypt all media valid in its region and CSS cannot be repaired without making the entire installed base of DVD players obsolete.

Another example is the public watermark scheme, which is used to encode copy-control information but is found insecure to detect and control piracy. The reason is the detection scheme of the conventional watermark scheme is publicly available, which enables the attacker to remove the watermark by sensitivity analysis (I. Cox, M. Miller, and J. Bloom, "*Digital Watermarking*," pp. 307-317, Morgan Kaufmann, 2002).

Among the recent efforts in providing a more effective long-term deterrent to the piracy of digital video content, the concept of "Self-Protecting Digital Content (SPDC)" (in P. Kocher, J. Jaffe, B. Jun, C. Laren, and N. Lawson, "*Self-Protecting Digital Content*," white paper, Cryptography Research Inc., 2003) proposed by Cryptography Research Inc. has received much attention. Based on SPDC technology, a security layer called $BD_+$ has been adopted in the Blu-ray Disc Format. The idea of SPDC is to build the security of content protection system not only in the player, but also in the content itself. Each digital title is designed to carry its own security code along with the content itself. During playback, this security code will be executed by the player to determine whether and how to decrypt and decode the content. For example, if a player has been compromised or if the user is making a copy, the security code might decide to refuse playback or play at a lower quality, while high-definition playback is reserved for players with superior security. This programmable security not only offers flexibility, but also allows security problems to be corrected without changes to the media format or the installed base of players. Furthermore, SPDC offers a future-proof solution to content piracy by allowing unexpected problems to be addressed through a simple update of the security code on all contents to be distributed.

Along with SPDC, the idea of "Forensic Marking" is also proposed by Cryptography Research Inc. to replace the conventional public watermark scheme. The goal of forensic marking is to embed identifying and diagnostic information into the content. The information can be later retrieved from digital or analog domain to identify piracy. In contrast to public watermark scheme, forensic marking uses a content-dependent detector, which greatly improves the security of the system. During embedding each bit of forensic mark, one of two or more versions for a portion of the content will be selected and decoded by the player. During detection, the embedded information can be retrieved by identifying the difference in the decoded content. Applying forensic marking on digital video in the state-of-the-art H.264 format ("Draft ITU-T Recommendation H.264 and Draft ISO/IEC 14496-10 AVC," in Joint Video Team of ISO/IEC JTC1/SC29/WG11 & ITU-T SG16/Q.6 Doc. JVT-G050, T. Wiegand, Ed., Pattaya, Thailand, March 2003) has been explored (by D. Zou, J. Bloom, "H.264/AVC stream replacement technique for video watermarking," in Proc. of IEEE Intl. Conf. on Acoustics, Speech and Signal Processing, 2008; and D. Zou, N. Prigent, J. Bloom, "Compressed video stream watermarking for peer-to-peer based content distribution network," in Proc. of IEEE Intl. Conf. on Multimedia & Expo., 2009). The marking information was embedded directly into the H.264 bitstream which has been entropy encoded using CAVLC or CABAC (D. Marpe, H. Schwarz, and T. Wiegand, "Context-based adaptive binary arithmetic coding in the H.264/AVC video compression standard," in IEEE Trans. on Circuits and Systems for Video Technology, Vol. 13, No. 7, July 2003). The decoded video is perceptually indistinguishable to the user but contains detectable information for the content producer to identify and track piracy.

Although forensic marking on an H.264 video stream has been shown to be a valid watermarking scheme which can achieve efficient embedding and reliable detection, its security attributed to content-dependent embedding and detection has not been carefully examined. In a practical content protection system, the encrypted content will contain random or no marking information, so that the content can be safely delivered to different users and through content distribution networks such as peer to peer (P2P) networks. The content can be decrypted and decoded only if the user has paid for the content and obtained its marking information from the content producer. This valid marking information will be embedded into the decoded content by the player to enable piracy tracing. Without valid marking information, the content either cannot be decoded or will have extremely low quality. It has been determined that without the valid marking information an adaptive brute-force attack can indeed improve the visual quality of the decoded output, even it is somewhat impossible to decode a randomly marked stream completely correct. As such, this adaptive brute-force attach undermines the security of the forensic marking scheme.

In light of the success of the adaptive brute-force to decrypt and decode content, a need exists to develop a methodology that substantially or completely reduces the potency of the adaptive brute-force scheme.

SUMMARY OF THE INVENTION

A security analysis for the forensic marking scheme for H.264 streams and the like is provided. A forensic marking scheme replaces portions of the video data by random or incorrect bytes and only a paid user can obtain the valid replacement data ("secret key") to decode the video.

A method is also provided that comprises encrypting video data with random or incorrect bytes; generating replacement data responsive to the random or incorrect bytes to decode the encrypted video; and distributing the replacement data to users.

BRIEF DESCRIPTION OF THE DRAWINGS

The invention will now be described by way of example with reference to the accompanying figures of which.

DETAILED DESCRIPTION OF THE EMBODIMENTS

Figure 1:
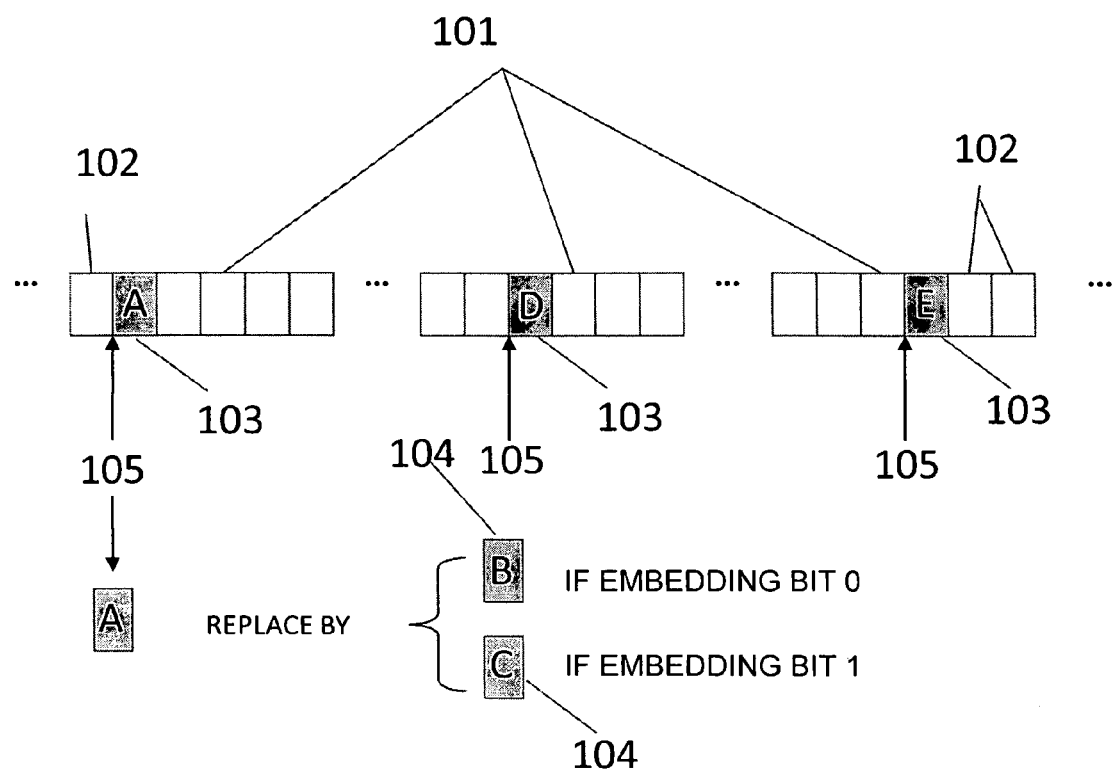
FIG. 1 illustrates the embedding process for a video stream utilized by the invention.

The invention focuses on security analysis of forensic marking schemes on H.264 video streams. The overall strategy, at a high level, is to reduce the potency of adaptive brute-force attack methodologies. As such, substantial disclosure and discussion of an adaptive brute-force methodology will be provided which will include analysis of the security of arithmetic coding based encryption. Hence, the following demonstrates how it is possible for an unauthorized user to decode a randomly marked stream with reasonably good visual quality. The disclosed attack strategy and security analysis can be extended to forensic marking on different forms of digital content and can provide valuable insight in the design of secure forensic marking schemes for content protection systems.

H.264 streams according to embodiments of the invention can generally be encoded using Context-based Adaptive Binary Arithmetic Coding (CABAC). CABAC is one of the two entropy coding methods adopted in the H.264 standard, which offers improved coding efficiency over the other CAVLC (Context-Adaptive-Variable-Length-Coding) method. Forensic marking on CABAC encoded stream is presently thought preferable, because it is expected to provide better security than forensic marking on CAVLC encoded stream.

The CABAC encoding process consists of, at most, three elementary steps: 1) binarization; 2) context modeling; 3) binary arithmetic coding. In the first step, a given nonbinary valued syntax element is uniquely mapped to a binary sequence, a so-called bin string. In the second step, a probabilistic context model is selected for each syntax element in an adaptive fashion that may depend on previously encoded syntax elements or bin strings. Finally, the bin value and its associated model are passed to the arithmetic coding engine. CABAC achieves good compression performance due to (a) selecting probability models for each syntax element according to the element's context; (b) adapting probability estimates based on local statistics; and (c) using arithmetic coding.

Embodiments of the invention can also incorporate arithmetic coding. Arithmetic coding is known for its speed, low storage requirements, optimal compression performance, and adaptive nature, and is gaining increased popularity in practical systems, including JPEG-2000, MPEG-4 and H.264 standards. (See J. Rissanen, "Generalized Kraft inequality and arithmetic coding," IBM J. Res. Dev. 20, 198-203, 1976; J. Rissanen, G. G. Langdon, "Arithmetic coding," IBM J. Res. Dev. 23, 149-162, 1979; and I. H. Witten, R. M. Neal, and J. G. Cleary, "Arithmetic coding for data compression," Communications of the ACM, Vol. 30, No. 6, 520-540, June 1987) Arithmetic coding can achieve fractional number of bits per symbol by successively dividing an initial interval into smaller intervals based on the probability of the current symbol under encoding. The encoded message is represented by any number within the final interval. In an adaptive arithmetic coding scheme, the symbol probability is updated based on the occurrence frequency of the symbols that have already been encoded.

Due to the successive interval division and the adaptive update of symbol probabilities, the encoding and decoding of any symbol in arithmetic coding heavily depends on the encoding and decoding of the previous symbols. This makes the arithmetic coding extremely sensitive to bit error, i.e. a single bit flip could cause the decoding of the following symbols completely different. The error sensitivity causes problems for reliable communication, but can be utilized for security purposes. (See I. H. Witten, J. G. Cleary, "On the privacy afforded by adaptive text compression," Computers and Security, 7:397-480, 1988.) The forensic marking scheme discussed here intentionally utilizes the error sensitivity of arithmetic coding for security.

To embed each bit into the H.264 stream, the forensic marking scheme chooses a position in the bitstream and replaces local content with one of two or more versions of the content. The embedding is allowed to occur at any position and the replacement content can have any variations as long as the decoded video appears indistinguishable to the user and at the same time contains detectable information for the content producer. Due to the error sensitivity of arithmetic coding used in the CABAC encoded stream, the choice of embedding position and replacement content needs to be chosen carefully.

During arithmetic decoding, the decoder maintains the decoding status, i.e. the current interval length and position. After replacing local content with a different version, it is necessary to ensure that at the end of the replacement content, the decoder status is unchanged, so that the decoding of following symbols is not affected by the embedding. The valid replacement content can be obtained by exhaustive search over all possible values. The position of replacement and the actual versions of content to replace can be determined by examining the decoded video. The positions and contents which result in degraded visual quality or quality changes undetectable to the content producer are discarded. The embedding process is illustrated in FIG. 1. Here the video stream is shown as including three separate groups 101 of video data which could each correspond to a frame of video data and each of the groups has bits 102 of data, wherein the selected bits 103 are selected for replacement by replacement bits 104 at the noted embedding position 105. In the first group 103 in FIG. 1, selected bit A will be replaced by replacement bits B or C. Likewise, selected bits D and E will be replaced but the replacement bits for D and E will be different than that for A.

The choice of replacement contents for a particular user is determined by the information that the content producer wants to embed into the bitstream. The embedding positions and replacement contents are distributed to a paid user separately from the distribution of the video content. The player will embed the received information into the decoded video. Upon the case of piracy, the content producer can detect the tracking information previously embedded in the suspicious copy. One example of detection is to examine the changes in the average luminance of particular blocks whose locations and original value of average luminance are known to the content producer.

In a preferred embodiment, the video content which is distributed to different users does not contain any marking information, because it is infeasible to create a different copy of content for each user. Moreover, the content is likely to be distributed through content distribution networks such as P2P network, where all the users will get exactly the same version of the content. To prevent any unauthorized user from accessing the content, encryption of the content provides the first layer of protection and replacing the embedding positions with random bytes gives additional protection. In case an attacker successfully decrypts the video, this second layer of protection can make the decoding fail or cause the decoded video to have extremely low quality. The security analysis below focuses on this second layer of protection offered by forensic marking.

In the following security analysis, one makes the following assumptions: 1) the attacker has a randomly marked H.264 bitstream; 2) the attacker can decode the stream using any software decoder or compromised hardware decoder; 3) the attacker can obtain the decoded video and any information regarding the decoding process; and 4) the attacker has no access to any valid marking information such as embedding positions and replacement contents. The last assumption is reasonable because one can assume that the marking information is distributed to a paid user in a secure fashion and the information can only be decrypted and used by the player during decoding process. Furthermore, releasing the marking information exposes the user to a high risk of being traced and facing prosecution. Therefore, the security analysis below focuses on whether and to what extent the attacker can improve the visual quality of the decoded video from a randomly marked H.264 stream, thus undermining the security of forensic marking.

The security of forensic marking on H.264 stream encoded using CABAC can be largely attributed to the error sensitivity and adaptive nature of arithmetic coding. Using arithmetic coding for encryption was first proposed by Witten and Cleary in their above mentioned paper, where either the initial model, i.e. the initial symbol probabilities, are used as the secret key, or a short message encoded before the actual message is used as the secret key. The idea is to randomize the decoder status so that without the key it is extremely difficult to correctly decode the entire message. However, security flaws of arithmetic coding based encryption have been found (J. Lim, C. Boyd, E. Dawson, "Cryptanalysis of adaptive arithmetic coding encryption schemes," Lecture Notes In Computer Science, Vol. 1270, Proceedings of the Second Australasian Conference on Information Security and Privacy, 1997). The attacks were carried out in the Chosen Plaintext Attack (CPA) model where the attacker can feed the encoder with any plaintext message and obtain the ciphertext. The idea of the attack is to search through the key space or initial model space so that the ciphertext produced by the attacker's encoder is the same as given by the actual encoder. Since arithmetic coding is very sensitive to bit error, an exact match of the ciphertext would give high confidence that the guessed key is correct.

In forensic marking on H.264 stream, the random replacement contents act as the secret key, which encrypts the remaining content in the current frame of the video. Without the valid replacement contents, the decoded video will have very low qualities. One example of such decoded video frame 201 from a randomly marked H.264 stream is shown in FIG. 2.

Figure 2:
FIG. 2 is an example of a video frame that had been encrypted with random and incorrect data according to the invention, but decoded without the valid replacement data.

FIG. 2 is a good example showing the two characteristics that have been observed on frames decoded from a randomly marked stream. One is the strong noise shown in some of the corrupted bands or slices 203 introduced into certain blocks. These corrupted bands 203 are dispersed between the uncorrupted bands or slices 202. This is because a random replacement will cause the decoding of following syntax elements to be wrong, i.e. the prediction might have used wrong reference blocks and the residual data is completely random. The strength of noise and the amount of noisy blocks vary greatly for different frames and even for different slices within a frame as shown by FIG. 2. The other characteristic is the large amount of missing blocks, which are replaced by constant intensity blocks after decoding as shown in FIG. 2. Actually, for each corrupted band, the first few blocks contain large noise, and most remaining blocks are missing and thus replaced by constant intensity blocks after decoding. This is because the arithmetic decoder will continue to consume bits until it obtains a valid syntax value and therefore either all the bits are consumed before the decoder can reach the end of slice or an end of slice symbol is obtained earlier by mistake. These two characteristics due to random replacement make the decoded video unwatchable and therefore protect the video content from unauthorized users.

If the exact locations of replacement are known to the attacker, the attacker can perform a brute-force attack to guess the original value of the content. Upon a successful guess, the decoded frame will have no missing or noisy blocks. Assuming the length of replacement content is N bytes, then the worst case complexity of the brute-force attack is $2^N$ trials per position. However, it is difficult for the attacker to find the exact positions of replacement. The reason is that when the arithmetic decoding process reaches a location of random replacement, it will not detect any error. Instead, it will continue to decode using the wrong context and produce syntax-wise valid values. The missing blocks or decoder crash usually happen at a much later position than the actual replacement position.

In spite of the difficulty and complexity to perform a brute-force attack to exactly recovery the original content, it still possible to perform an approximate recovery to improve the visual quality to a bearable level. Recall that the effect of random replacement is to scramble the status of arithmetic decoder so that all the following bits are interpreted wrong. This also implies that as long as the decoder status at the beginning of each syntax decoding is correct, all the following bits will be decoded correctly. Therefore, the knowledge of exact replacement position is not necessary and one can perform a brute-force attack anywhere near or after the replacement position to correctly interpret as many bits as possible. The proposed brute-force attack adaptively determines replacement positions to try based on the location of the first missing block and automatically identifies a good guess if the number of missing blocks is substantially reduced.

The attack strategy is described as follows:
1. Decode the H.264 bitstream and obtain the position of the first missing block in each frame.
2. Loop through all the frames which have missing blocks:
   a. Select several positions before the first missing block.
   b. Randomly generate bits to replace the original bits at the positions chosen in step (a).
   c. Decode the resulted frame, record the replacement bits and the number of missing blocks.
   d. Go back to step (b) until the maximum number of trials have been reached.
3. Decode the H.264 bitstream using the replacement bits which give the minimum number of missing blocks for each frame.

Here one uses the first missing block to approximately estimate the actual replacement position because missing blocks appear much more consistently than noisy blocks for a randomly marked H.264 stream.

In the experiment, one performs the proposed adaptive brute-force attack on a randomly marked H.264 stream of the high-definition movie "Royal Wedding." For simplicity but without loss of generality, only one random marking is made for each B-frame of the video. Results on the recovery of the first 100 frames are presented below. The empirical range of the actual marking position relative to the position of the first missing block is about 10-150 blocks. The average length of each block in the B-frame is approximately 10 bytes. Therefore, attack positions in step 2-a can be chosen to be in the range of 400-1500 bytes before the first missing block. In the experiments, attacks were performed at 100, 200, 300, 500, 700, 1000 bytes before the first missing block. The length of replacement content is 5 bytes, i.e. during the attack, 5 random bytes will be generated and replacing the 5 bytes in the marked stream at the above specified positions.

After each trial of the attack, the modified stream will be decoded to obtain the number of missing blocks. Around 7000 trials were performed for each marked frame and the attack performance on reducing the number of missing blocks is shown in Table 1 and FIG. 3.

Figure 3:
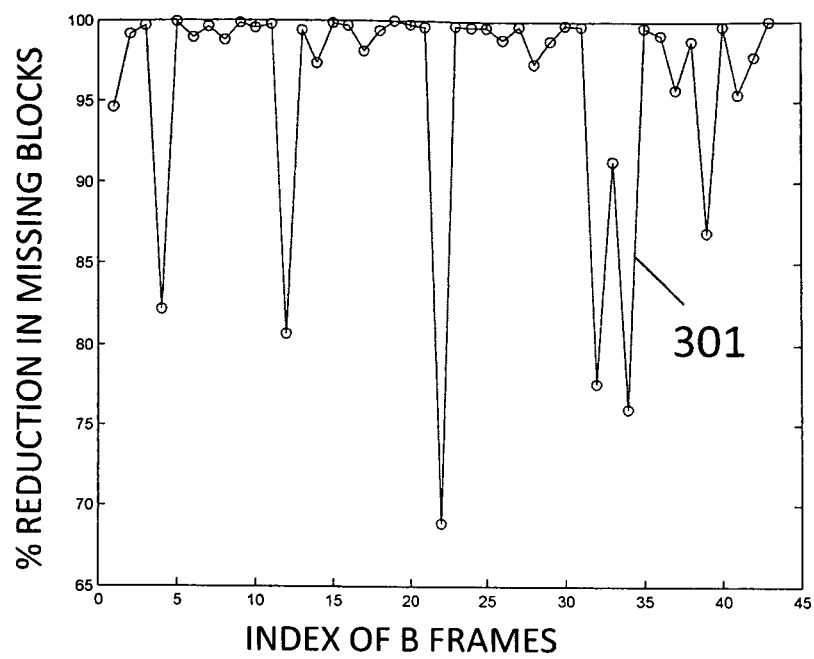
FIG. 3 is an example of the percentage of reduction in the number of missing blocks after decoding the encrypted data by an adaptive decryption brute-force attack strategy as compared to that without using the strategy.
Figure 4:
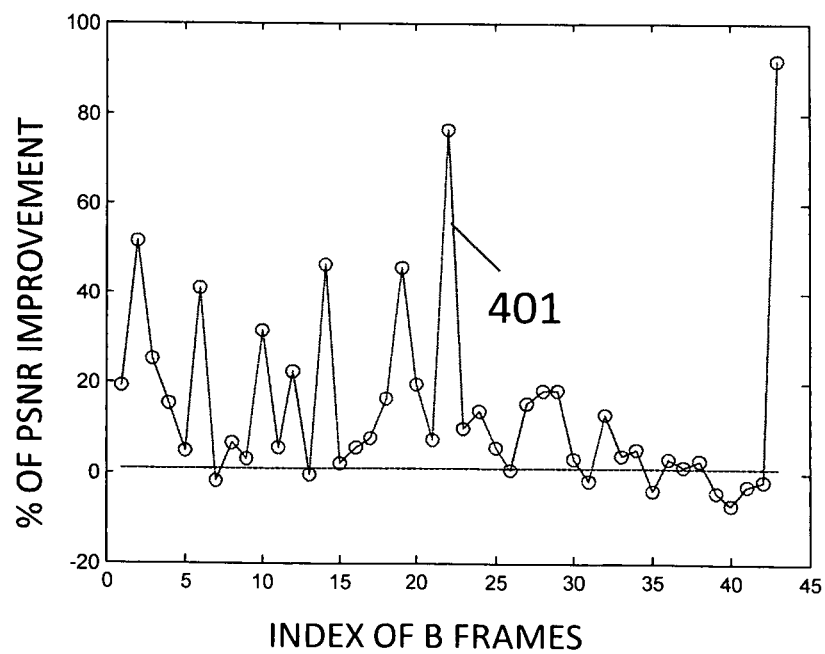
FIG. 4 is an example of the percentage of PSNR improvements after decrypting the encrypted data by the adaptive decryption brute-force attack strategy as compared to that without using the strategy.
Figure 5:
FIG. 5A is an example of a decoded video frame that was randomly encrypted and decoded without using the adaptive decryption brute-force attack strategy.
FIG. 5B is an example of a decoded video frame which was randomly encrypted and corrected by the adaptive decryption brute-force attack strategy.
Figure 5:

FIG. 3 shows the percentage of reduction in the number of missing blocks for the 43 B-frames in the first 100 frames in a curve 301. It can be observed that most of the reductions are above 95%. The average percentage of reduction is 96%. To evaluate the correlation between the number of missing blocks and the visual quality, Table 1 provides the relative PSNR (peak signal-to-noise ratio) improvement of the frames with the minimum number of missing blocks compared to the frames before the attack correction. Also, FIG. 4 shows the percentage of PSNR improvement after the attack for all the 43 B-frames in curve 401. It can be seen that large reduction in the number of missing blocks does not necessarily imply a large PSNR improvement. Although in most cases, PSNR improves after the correction, it is observed that for some frames PSNR improves only a little or may even decrease after the correction. The small or negative PSNR improvement is possibly due to more noisy blocks replacing the originally missing blocks; however, it has been found that noisy blocks actually deliver more details than missing blocks and visual quality still improves substantially in these cases. An additional noise reduction step can be applied if the decoded frames have lots of noisy blocks. Decoding for frame 18 is shown in FIG. 5 to illustrate the point, wherein FIG. 5a is the decoded frame from randomly marked H.264 stream and FIG. 5B is the frame of FIG. 5A corrected by the attack in which PSNR increases 19.22 dB. It is thought that PSNR is not a good metric for visual quality assessment. A better measure could be applied to better evaluate the visual quality improvement. Table 2 shows the PSNR improvement after median filtering of corrected frames. Median filter works well for frames with many noisy blocks, but can degrade visual quality of frames with very few noisy blocks because of the blurring effect.

TABLE 2

PSNR improvement after 3 × 3 median filtering

| Frame number | PSNR improvement | PSNR improvement after median filtering |
|---|---|---|
| 6 | 4.60 dB | 6.00 dB |
| 8 | 11.23 dB | 11.33 dB |
| 10 | 6.24 dB | 7.69 dB |
| 16 | 3.59 dB | 4.24 dB |
| 18 | 1.14 dB | 3.24 dB |
| ... | ... | ... |
| 98 | 19.22 dB | 18.13 dB |

It can be observed from the above results that the proposed brute-force attack can greatly improve the video quality decoded from a randomly marked H.264 stream. To evaluate the computational complexity of such an attack, the approach

TABLE 1

Performance of adaptive brute-force attack

| Frame number | Original number of missing blocks | Minimum number of missing blocks achieved | Percentage of reduction | Mean | Standard deviation | PSNR improvement |
|---|---|---|---|---|---|---|
| 6 | 1632 | 88 | 94.6% | 1509.7 | 178.2 | 4.60 dB |
| 8 | 1260 | 11 | 99.1% | 1147 | 176.4 | 11.23 dB |
| 10 | 277 | 1 | 99.6% | 311.9 | 404.4 | 6.24 dB |
| 16 | 1847 | 330 | 82.1% | 1740.1 | 178.2 | 3.59 dB |
| 18 | 999 | 1 | 99.9% | 878.4 | 173.4 | 1.14 dB |
| ... | ... | ... | ... | ... | ... | ... |
| 98 | 2017 | 1 | 99.95% | 1285 | 857.5 | 19.22 dB | considers a video content with length of 90 mins, such as a typical movie. Assuming 30 frames per second, there will be 16200 frames. Using the proposed experimental setting where only one marking is performed for each frame, each of these 16200 marking will be examined by the brute-force attack using n trials of random guessing and decoding. Since after each trial of random guessing, the current frame needs to be decoded in order to obtain the number of missing blocks, the computational time of the attack would be n times the decoding time of the original stream. The parameter n is chosen by the attacker to control the trade-off between complexity and performance. To estimate the typical value of n, estimated probabilities can be listed for the different amount of reduction in the number of missing blocks in Table 3.

TABLE 3

Probability of reduction in the number of missing blocks by the attack

| Percentage of reduction | Average case probability | Average value of n | Worst case probability | Worst case average value of n |
|---|---|---|---|---|
| 99% | 0.0008 | 1182.4 | 0 | Inf |
| 95% | 0.0042 | 239.3 | 0 | Inf |
| 90% | 0.0083 | 120.3 | 0 | Inf |
| 80% | 0.0181 | 55.1 | 0 | Inf |
| 70% | 0.0305 | 32.8 | 0 | Inf |
| 60% | 0.0470 | 21.3 | 0.0008 | 1299 |
| 50% | 0.0692 | 14.4 | 0.0018 | 541.3 |
| 30% | 0.1502 | 6.7 | 0.0286 | 34.9 |
| 10% | 0.3849 | 2.6 | 0.2239 | 4.5 |

From the above table, it can be observed that on average, the attacker needs on the order of 1000 trials per position in order to reduce the number of missing blocks to 1% of the original value and only on the order of 100 trials per position to reduce the number to 5% of the original value. It should also be mentioned that it may not be possible to significantly reduce the number of missing blocks at every position. In the worst case, only 60% reduction can be achieved and around 1000 trials are required. Using hardware assisted real-time decoding, a brute-force attack involving 1000 trials on a video of 90 mins long would take about 2 months to complete. Reduce the number of trials to 200, the attack would still take 2 weeks to recovery the entire video. However, this computational time can be significantly reduced if the attacker applies parallel computing, e.g. using today's powerful graphics processing unit (GPU). Therefore, the proposed brute-force attack can seriously undermine the security of forensic marking on the H.264 streams.

The proposed brute-force attack is at the bitstream level, i.e. by replacing portions of the bitstream to improve visual performance. Another possible attack on H.264 streams marked only on the B-frames can be using adjacent I-frame and P-frame to predict the content of missing blocks in the B-frame. Since the motion among adjacent frames is typically very small, most of the missing information can be inferred from adjacent frames to a very good accuracy. To counter this semantic level attack, marking should also be performed on I-frames and P-frames, so that motion prediction becomes difficult and the resulted B-frame will have extremely low visual quality. To increase the difficulty for the brute-force attack, more marking positions should be used for each frame, where some of the marking positions can be used to improve security but not carry any information. As a trade-off, this will increase the size of marking information to be distributed separately to a paid user. The proposed brute-force attack calls for more careful and secure design for forensic marking on H.264 streams, where it should be provably difficult for an attack to detect and remove the marking.

In sum, an embodiment of the invention includes the method of coding video data with incorrect or missing bytes, whereby the coded video is corrupted or distorted; generating replacement data that corrects the coded video during decoding; and distributing the replacement data to users. The method can include distributing the coded video data to users separately from the distributing step of the replacement data to reduce the chances of an unauthorized user intercepting the coded data and a replacement data at one time. The incorrect data can be random data or can be blank bytes of data, whereby the corrupted or distorted portion of video associated within the blank bytes are a single color such as all black as in the top band 203 in FIG. 2. The incorrect bytes can be so arranged to be slices as shown in FIG. 2. Additionally, the incorrect or missing bytes can be placed in different locations from one frame to an adjacent frame. Also, the incorrect or missing bytes can be applied to only I-frames and P-frames. Another important step is for the user or user's equipment to decode the coded video data with the replacement data, thereby correcting the coded video data. The method can further comprise arranging the incorrect, missing, or random bytes such that at least one slice in each frame of video is corrupt or distorted.

An additional embodiment of the invention can include the above mentioned method with the provider performing an addition analysis on the coded data. This can include decoding the coded video; obtaining the positions of the first missing block in each frame in a sequence of frames; looping through all frames in the sequence which have missing blocks; randomly generating replacement bits to replace original bits at the positions and positions that include at least an adjacent prior block; and decoding the coded video using the bits generated in the generating step. The visual quality of the decoded video with the random replacement bits can then be compared to some preselected threshold visual quality level to determine the effectiveness of the coding step. If the provider believes that the visual quality of the decoded video with the random replacement bits exceeds the acceptable visual quality threshold, the provider can then recode the video with additional random replacement data to further corrupt or distort the video.

The invention claimed is:

1. A method comprising:
   intentionally coding video data with incorrect or missing bytes, whereby the coded video is corrupted or distorted;
   generating replacement data that corrects the coded video during decoding; and
   distributing the replacement data to users,
   wherein the method codes the video data into a single bit stream, and the generating replacement data generates the replacement data for the single bit stream;
   wherein the coding video data includes applying blank bytes as the incorrect bytes, at least one corrupt or distorted portion of video associated within the blank bytes is a single color.

2. The method of claim 1, further comprising distributing the coded video data to users separately from the distributing of the replacement data.

3. The method of claim 1, further comprising applying random bytes of data in the coding as the incorrect bytes.

4. The method of claim 1, further comprising arranging the incorrect or missing bytes such that at least one corrupt or distorted portion of decoded video is a slice.

5. The method of claim 1, further comprising coding a plurality of consecution frames of video data such that the incorrect or missing bytes are placed in different locations from one frame to an adjacent frame.

6. The method of claim 1, further comprising coding a plurality of consecution frames of video data such that the incorrect or missing bytes are applied to only I-frames and P-frames.

7. The method of claim 1, further comprising decoding the coded video data with the replacement data, thereby correcting the coded video data.

8. The method of claim 1, further comprising:
decoding the coded video;
obtaining the positions of the first missing block in each frame in a sequence of frames;
looping through all frames in the sequence which have missing blocks;
randomly generating replacement bits to replace original bits at the positions and positions that include at least an adjacent prior block; and
decoding the coded video coding using the bits generated in the generating.

9. The method of claim 8, further comprising:
obtaining visual quality of the decoded video with the replacement bits;
comparing the visual quality to an acceptable visual quality threshold; and
recoding the video with additional incorrect or missing bytes if the visual quality exceeds the acceptable visual quality, wherein the coded video is further corrupted or distorted and the replacement data includes data for the additional incorrect or missing bytes.

10. The method of claim 1, further comprising arranging the incorrect or missing bytes such that at least one slice in each frame of the video is corrupt or distorted.

11. A method comprising:
intentionally corrupting a video data stream when encoding video data for the video data stream so as to include incorrect or have missing bytes of data during decoding of the corrupted video data stream;
generating replacement data for correcting the incorrect or missing bytes; and
distributing the replacement data to authorized users,
wherein the method codes the video data into a single bit stream, the single bit stream being the video data stream, and said generating step generates the replacement data for the single bit stream;
wherein the coding of the video data include applying blank bytes as the incorrect bytes, at least one corrupt or distorted portion of video associated within the blank bytes is a single color.

12. The method of claim 1, further comprising distributing the corrupted video data stream to authorized users separately from the distributing step of the replacement data.

13. The method of claim 12, further comprising arranging the incorrect or missing bytes such that at least one corrupt portion of corrupted video data stream is a slice.

14. The method of claim 12, further comprising arranging the incorrect or missing bytes such that at least one slice in each frame of corrupted video data stream is corrupt.

15. A player comprising:
a memory and a processor;
coded digital video content received as a single bit stream, wherein the coded digital video content contains incorrect or missing bytes such that the coded digital video content is corrupted or distorted and at least one corrupt or distorted portion of coded digital video content is coded by applying blank bytes as the incorrect bytes in which the at least one corrupt or distorted portion of video associated within the blank bytes is a single color;
a decoder adapted to receive and decode the coded digital video content;
replacement data that corrects the digital video content during decoding, the replacement data is content generated to correct the digital video content and distributed to and received by the player separately from the coded digital video content.

* * * * *